Figure 1:
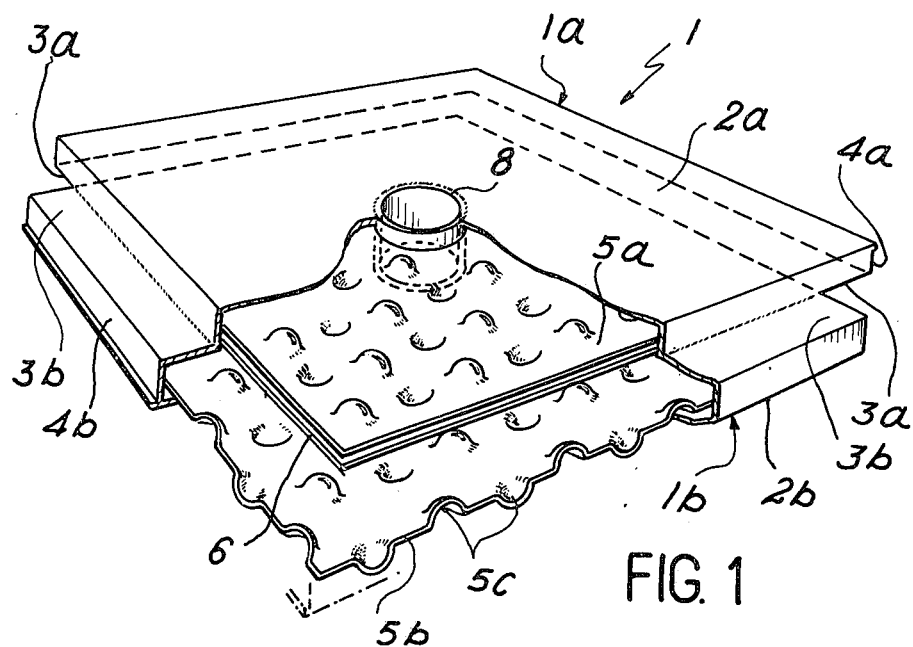

United States Patent [19]

Barriere et al.

[11] 3,958,714

[45] May 25, 1976

[54] HEAT-INSULATING STRUCTURE

[75] Inventors: Andre Barriere, Morsang-sur-Orge; Pierre Rough, Orsay, both of France

[73] Assignee: Commissariat a l'Energie Atomique, Paris, France

[22] Filed: Feb. 7, 1974

[21] Appl. No.: 440,506

[30] Foreign Application Priority Data

Feb. 15, 1973 France .............................. 73.05388

[52] U.S. Cl. .................................. 220/10; 52/249; 52/379; 52/618; 220/63 R
[51] Int. Cl.² ............................................ B65D 7/12
[58] Field of Search ................ 220/9 LG, 10, 63 R; 161/49, 52, 53, 114, 115; 52/378, 379, 592, 603, 249, 615, 617, 618

[56] References Cited
UNITED STATES PATENTS

| | | | |
|---|---|---|---|
| 1,956,323 | 4/1934 | Gregg | 161/53 X |
| 2,762,470 | 9/1956 | Parkes et al. | 52/535 X |
| 2,859,895 | 11/1958 | Beckwith | 220/9 LG X |
| 3,282,011 | 11/1966 | Meserole et al. | 52/618 X |
| 3,325,037 | 6/1967 | Kuhn et al. | 220/9 LG |
| 3,412,518 | 11/1968 | Waite | 52/592 |
| 3,525,661 | 8/1970 | Jackson | 220/9 LG X |
| 3,595,728 | 7/1971 | Robson | 52/249 X |
| 3,647,606 | 3/1972 | Notaro | 161/52 |

FOREIGN PATENTS OR APPLICATIONS

| | | | |
|---|---|---|---|
| 418,781 | 3/1947 | Italy | 52/592 |
| 208,174 | 10/1966 | Sweden | 220/9 LG |
| 402,845 | 12/1933 | United Kingdom | 52/592 |

*Primary Examiner*—George E. Lowrane
*Assistant Examiner*—Stephen Marcus
*Attorney, Agent, or Firm*—Lane, Aitken, Dunner & Ziems

[57] ABSTRACT

In a heat-insulating structure conisting of stacks of metallic modular elements placed in imbricated relation by means of overlapping edge portions, each stack is assembled by means of a single fastening member which is passed right through; and each modular element comprises a leak-tight chamber divided into two equal compartments having the shape of right-angled parallelepipeds, overlapping edge portions formed by the compartments which are relatively displaced along one diagonal, a spacer member fixed between the large bearing faces of the chamber and a filling structure within each compartment.

2 Claims, 5 Drawing Figures

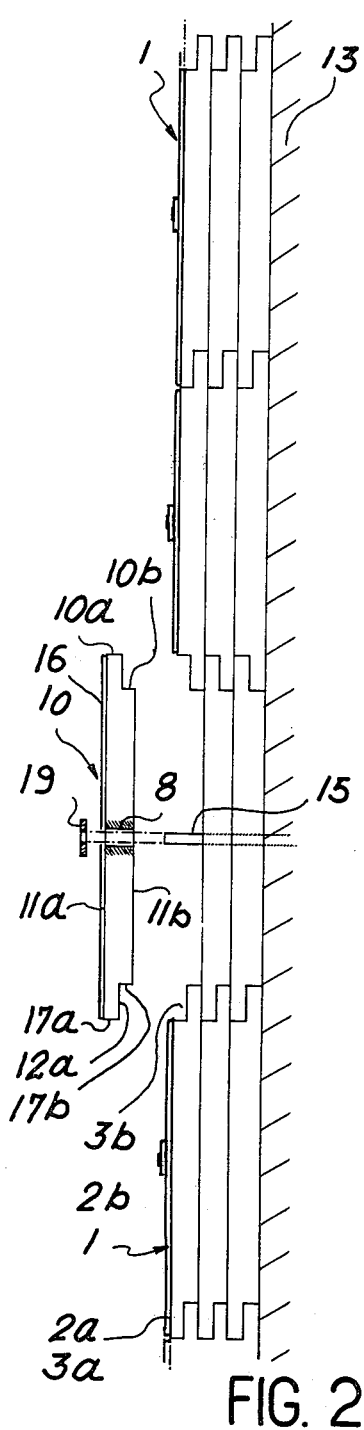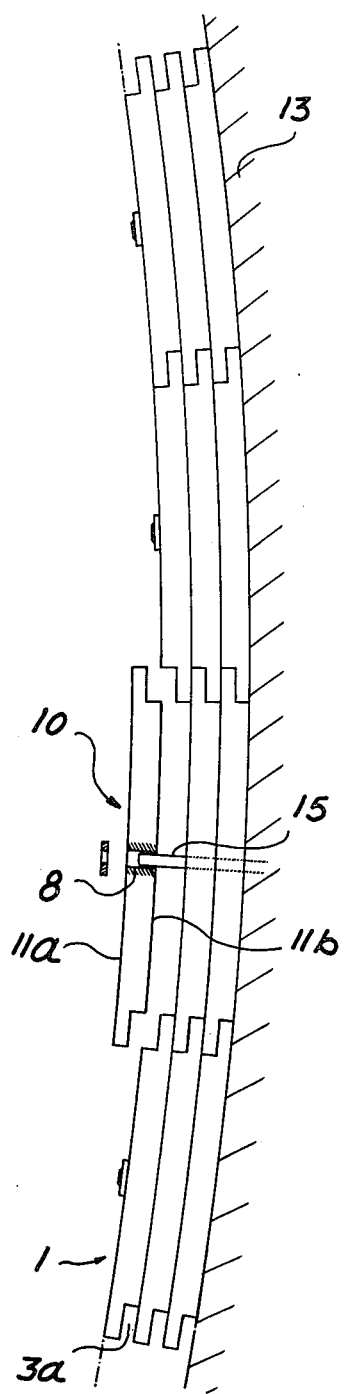

HEAT-INSULATING STRUCTURE

This invention relates to heat-insulating structures which are intended to come into direct contact with heat-transporting fluids employed in enclosures such as reactor vessels and containers for the chemical industry.

One object of the present invention is to form a relatively leak-tight heat-insulating structure having superposed layers for preventing infiltrations of heat-transporting fluids such as liquid metals in particular and to establish a thermal bridge between the layers.

To this end, the heat-insulating structure under consideration essentially comprises stacks of metallic modular elements having overlapping edge portions and placed in imbricated relation, each stack being assembled by means of a single fastening member which passes through said stack. The stacks of elements can be disposed in flat or curved layers or alternatively at right angles, depending on the profile of the enclosure wall on which the modular elements are mounted.

In one highly advantageous embodiment of the invention, said modular elements each comprise:
— a leak-tight chamber divided into two equal compartments having the shape of right-angled parallelepipeds which communicate through the common internal faces thereof;
— overlapping edge portions formed by said compartments which are relatively displaced along one and the same diagonal;
— a spacer member fixed between the large bearing faces of the chamber, namely the faces which have equal dimensions;
— a filling structure within each compartment aforesaid.

The stacks which are formed from modular elements having relatively displaced overlapping edge portions produce a baffle effect which ensures the desired leak-tightness and limits infiltrations of heat-transporting fluid.

In order to form the junctions between modular elements placed at the same level on a wall, provision is made in accordance with an alternative form of the preceding embodiment for modular elements designated as "keys" which facilitate assembly or disassembly and each comprise:
— a leak-tight chamber divided into two unequal compartments having the shape of right-angled parallelepipeds which communicate through the common internal faces thereof;
— overlapping edge portions formed by said compartments which are centered on the common point of intersection of their respective diagonals;
— a spacer member fixed between the large bearing faces of the chamber, namely the faces which have unequal dimensions;
— a filling structure within each compartment aforesaid.

The modular elements constructed in accordance with this alternative embodiment thus become junction elements between the modular elements in which the edge portions relatively displaced in the same direction are located on the same level at equal distances on each side of the spacer member of each aforementioned element having centered edge portions.

It is particularly advantageous to employ said modular elements in operations involving partial assembly and disassembly.

The two embodiments described in the foregoing can have lateral faces which are modified so as to conform to single points of the heat-insulating structure such as, for example, corners of walls, pipe penetrations and the like.

In the forms of construction mentioned above, it will be noted that the clearance spaces provided between the lateral faces of the chambers of the modular elements are sufficient to permit of free expansion.

In accordance with one advantageous property of the invention, the means for fastening each stack of modular elements comprise a tie-bolt which passes through the spacer member of each chamber and a pressure element which cooperates with said tie-bolt and clamps said stack in such a manner as to ensure a sufficient contact pressure between the bearing faces of the modular elements and to limit infiltrations of fluid.

Within each chamber, the filling structures are preferably formed of metal, have a sufficient degree of rigidity and are as highly conductive as possible. Several types of structure may be contemplated and among these can be mentioned by way of example a pleated, corrugated or fluted structure, a honeycomb structure, a structure formed of thin tubes or alternatively of compacted powder. The structures are separated by an intercalary element which is not necessarily rigidly fixed to the chamber.

In order to fabricate a modular element, the metallic compartments of each leak-tight chamber are assembled together by welding, provision is made for a tubular spacer member which passes through the instantaneous center of rotation of said chamber at right angles to the bearing faces and said spacer member is welded to the bearing faces by the electron beam process while maintaining a vacuum within each chamber.

Figure 5:
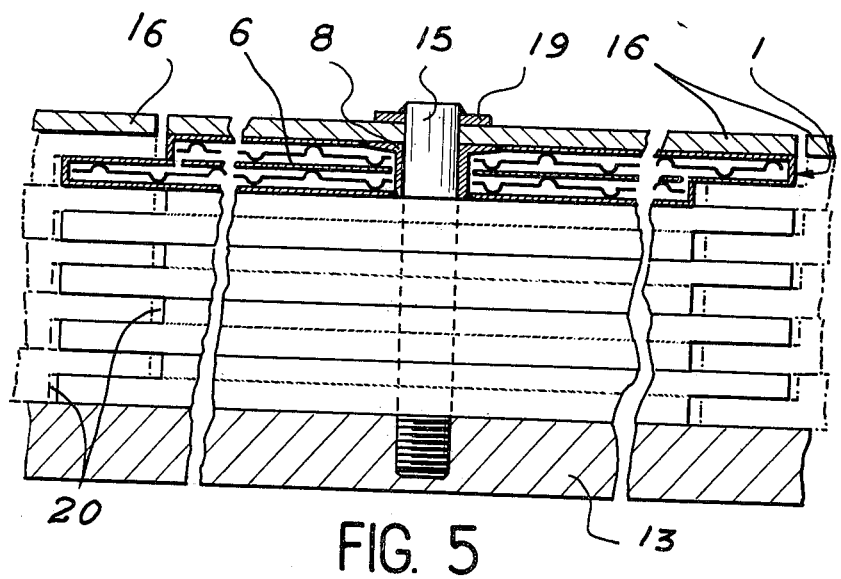
Figure 4:
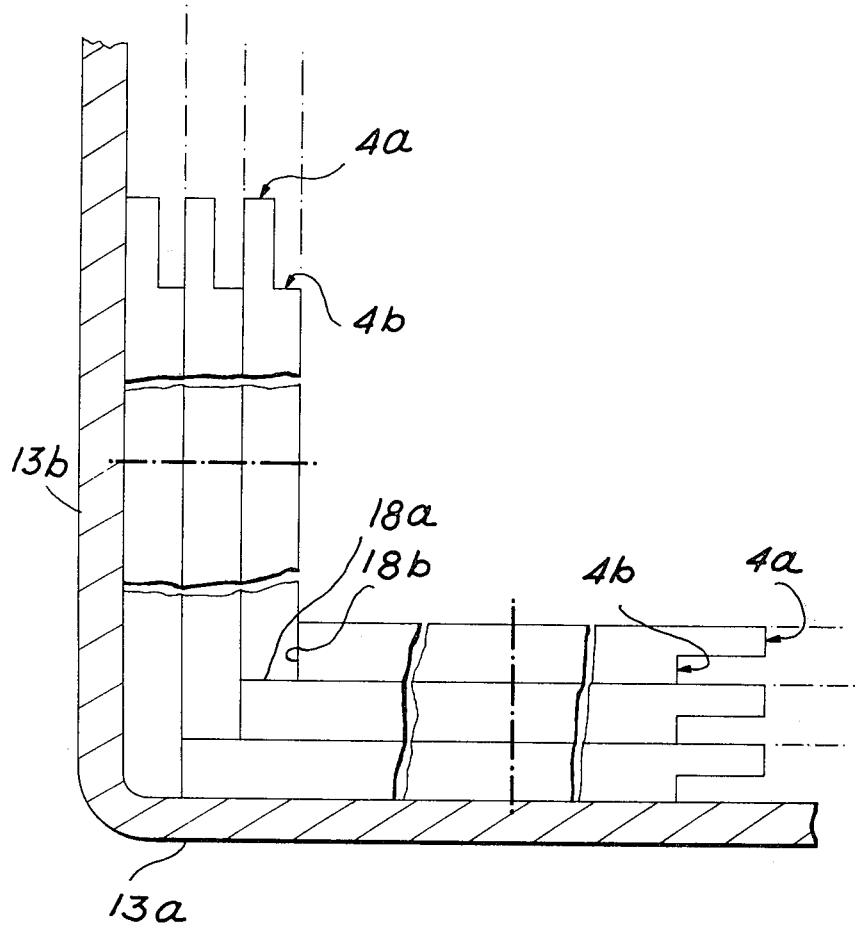

The following description relates to examples of construction which will be described with reference to the accompanying drawings, wherein:
— FIG. 1 is a view in perspective showing a modular element of the heat-insulating structure in accordance with the invention;
— FIG. 2 is a sectional view of a rectilinear stack of modular elements;
— FIG. 3 is a sectional view of a curved stack of modular elements;
— FIG. 4 is a sectional view of a right-angled stack of modular elements;
— FIG. 5 is a detail sectional view of the fastening of a stack.

FIG. 1 illustrates a modular element in accordance with the invention which comprises a leak-tight chamber 1 divided into two equal compartments 1a and 1b each having the shape of a right-angled parallelepiped. Said compartments are relatively displaced along a diagonal which is common to the large bearing faces 2a and 2b of the chamber 1 and this latter consequently has overlapping edge portions 3a and 3b of equal width which are also relatively displaced as shown in FIG. 1.

The overall height of the leak-tight chamber 1 is of very small value compared with the area of its bearing faces 2a, 2b and is constituted by the respective heights of the small lateral faces 4a and 4b.

The design of the compartments 1a and 1b is such that these latter communicate with each other through the common portions of their internal faces. The filling structures 5a and 5b have a sufficient degree of rigidity and the lowest possible conductivity; they are obtained from pleated or fluted metal, from metal which is worked so as to form a honeycomb structure or from thin tubes or else they can be obtained from compacted powder. The filling structures shown in FIG. 1 are formed from a thin sheet-metal element which has been die-stamped on each side of its plane so as to form cavities 5c having the same height. The structures of the respective compartments are separated by a free intercalary element 6.

A tubular spacer member 8 is secured at right angles to the large bearing faces 2a, 2b; the axis of said spacer member passes through the instantaneous center of rotation of the chamber 1.

In the method according to the invention, a vacuum is maintained within the chamber 1 and this latter is welded to the spacer member 8 by means of an electron beam. By this method, any convective heat transfer within the chamber 1 constituting the modular element is accordingly suppressed.

The relatively-displaced overlapping edge portions 3a, 3b of each leak-tight chamber 1 permit the geometrical imbrication (FIGS. 2 to 4) of the stacks of the heat-insulating structure.

In order to facilitate assembly and disassembly of the structure, the invention also makes provision for modular elements or chambers 10 referred-to as "keys" (shown in FIGS. 2 and 3).

A leak-tight chamber 10 of this type is divided into two unequal compartments 10a and 10b having the shape of right-angled parallelepipeds and centered with respect to the point of intersection of the diagonals of the large (unequal) bearing faces 11a and 11b through which the instantaneous center of rotation of the chamber 10 passes, with the result that the periphery of said chamber has overlapping edge portions 12a of equal width.

The chamber 10 is constructed and fitted with filling structures in the same manner as the chamber 1.

It will be noted that the edge portions 3a, 3b and 12a of the chambers 1 and 10 all have the same width in order to permit either imbrication of the modular elements (1) having relatively-displaced edge portions or the imbrication of modular elements (10) having centered edge portions.

FIG. 2 shows a stack of modular elements 1 having relatively-displaced edge portions 3a, 3b and placed on an enclosure wall 13 in a straight alignment. FIG. 3 shows the same stack in a curved alignment. In these two figures, modular elements 10 or keys are positioned in such a manner that their centered overlapping edge portions 12a are placed in juxtaposed relation to the relatively-displaced edge portions 3b of the modular elements 1.

The stacks of modular elements of both types are guided by means of a tie-bolt 15 which is passed through the spacer members such as the member 8 (as also shown in FIG. 5).

When the stack is intended to be erected in a corner formed by the meeting of two enclosure walls 13a, 13b, the arrangement illustrated in FIG. 4 must accordingly be adopted. In this case the sides of the chambers are modified to permit a step-pattern imbrication and to form overlapping edge portions 18a and 18b which perform the same function as the edge portions 3a, 3b and 12a.

FIG. 5 illustrates in detail one example of assembly of the heat-insulating structure. As a result of the modular construction of the chambers such as 1 or 10, the spacer members 8 are aligned on one and the same axis, with the result that assembly and fastening of the stacks are carried out by means of a single tie-bolt 15 passed through said spacer members. The tie-bolt 15 is anchored at one end in the wall 15 of the enclosure and the other end of said tie-bolt cooperates with a suitable fastening means (such as a nut 19, for example) for applying the pressure element 16 against the stack. The dimensions of the pressure element 16 are either equal to or smaller than those of a large bearing face; said pressure element can be formed from a thick sheet-steel plate, a cruciform spider and so forth.

In all the cases illustrated, the dimensional variations of the heat-insulating structure under the action of thermal stresses (extension and deformation of the chambers 1 and 10) are compensated by the clearance spaces 20 (FIG. 5) between stacks.

It will readily be apparent that the shape given to the modular elements or chamber 1 (or 10) is not limitative in any sense; in particular, the invention extends to all geometries of the large bearing faces, namely triangular, hexagonal, square, octogonal and so forth.

What we claim is:

1. A heat insulating apparatus comprising a plurality of metallic modular members each defining two stacked compartments, each compartment having the shape of a right-angled parallelepiped, said compartments communicating through a common internal face defining overlapping edge portions, said members being disposed in a stacked relationship with their respective edge portions extending in an imbricated relationship, a tie bolt extending through said tubular member, a pressure plate engaging the outermost member and cooperating with said tie bolt to clamp said members in said stacked relationship, and a tubular member extending perpendicular to and attached to said members and cooperating with said tie bolt for maintaining said members in a predetermined alignment.

2. A heat insulating apparatus comprising a plurality of metallic modular members each defining two stacked compartments, each compartment being maintained in a vacuum and each having the shape of a right-angled parallelepiped, said compartments communicating through a common internal face defining overlapping edge portions, said members being disposed in a stacked relationship with their respective edge portions extending in an imbricated relationship, fastening means for fastening said members in a stacked relationship, and means extending perpendicular to and attached to said members for cooperating with said fastening means to maintain said members in a predetermined alignment.

* * * * *